(12) United States Patent
Andrew et al.

(10) Patent No.: US 6,542,641 B1
(45) Date of Patent: Apr. 1, 2003

(54) METHOD AND APPARATUS FOR DECODING A CODED REPRESENTATION OF A DIGITAL IMAGE

(75) Inventors: James Philip Andrew, Waverton (AU); Dominic Yip, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/430,027

(22) Filed: Oct. 29, 1999

(30) Foreign Application Priority Data

Oct. 30, 1998 (AU) .............................................. PP6864

(51) Int. Cl.[7] .............................. G06K 9/36; G06K 9/46
(52) U.S. Cl. ........................................ 382/233; 382/240
(58) Field of Search ................................ 382/232, 233, 382/240, 244, 247, 248, 173, 180; 358/426.13, 426.16

(56) References Cited

U.S. PATENT DOCUMENTS

| | | | | |
|---|---|---|---|---|
| 5,412,741 A | * | 5/1995 | Shapiro ....................... 358/1.9 |
| 5,748,786 A | * | 5/1998 | Zandi et al. ................. 382/240 |
| 6,163,626 A | | 12/2000 | Andrew ....................... 382/240 |

FOREIGN PATENT DOCUMENTS

| | | |
|---|---|---|
| EP | 0 618 727 B1 | 10/1994 |
| EP | 0 855 838 A2 | 7/1998 |
| WO | 00/35187 | 6/2000 |

OTHER PUBLICATIONS

J. Andrew, "A Simple and Efficient Hierarchical Image Coder", Proceedings ICIP '97, Santa Barbara, USA, vol. 3, pp. 658–661, 1997.

A. Said and W.A. Pearlman, "A New, Fast and Efficient Image Codec Based on Set Partioning in Hierarchical Trees", IEEE Transactions on Circuits and Systems for Video Technology, vol. 6, No. 3, pp. 243–250, Jun. 1996.

Andrew Bruce et al. Wavelet Analysis, Localized Waveforms are Powerful Building Blocks for Signal Analysis and Rapid Prototyping–and Now Available in Software Tool Kits, IEEE Spectrum, Oct. 1996, pp. 26–35.

* cited by examiner

*Primary Examiner*—Phuoc Tran

(57) ABSTRACT

The method decodes an compressed representation of a digital image. The compressed representation is in the form of a bitstream comprising in sequence encoded bitplanes each having first portions representative of the significances of first sub-regions in the current bitplane and second portions representative of respective bits of each coefficient in second sub-regions of the current bitplane. The method decodes each bitplane of a block of transform coefficients from a maximum bitplane to a minimum bitplane in the following manner. The method decodes the first portion as the respective significances of the first sub-regions in the current bitplane and decodes the second portion as the respective bits of each coefficient in the second sub-regions of said current bitplane.

8 Claims, 5 Drawing Sheets

One level DWT

One level DWT

Two level DWT

Four level DWT

Fig. 4   Tiling of the subbands

METHOD AND APPARATUS FOR DECODING A CODED REPRESENTATION OF A DIGITAL IMAGE

FIELD OF INVENTION

The present invention relates in general to decoding a coded representation of a block of coefficients of a digital image. In particular, the invention relates to the decoding of a coded representation of a block of transform coefficients of a digital image.

BACKGROUND OF INVENTION

In the field of digital image compression, many different techniques have been utilized. In particular, one popular technique is the JPEG standard which utilizes the discrete cosine transform to transform standard size blocks of an image into corresponding cosine components. The JPEG standard also provides for the subsequent compression of the transformed coefficients.

Recently, the field of wavelet transforms has gained great attention as an alternative form of data compression. The wavelet transform has been found to be highly suitable in representing data having discontinuities such as sharp edges. Such discontinuities are often present in image data or the like.

Although the preferred embodiments of the present invention will be described with reference to the compression of image data, it will be readily evident that the preferred embodiment is not limited thereto. For examples of the many different applications of Wavelet analysis to signals, reference is made to a survey article entitled "Wavelet Analysis" by Bruce et. al. appearing in IEEE Spectrum, October 1996 page 26–35. For a discussion of the different applications of wavelets in computer graphics. reference is made to "Wavelets for Computer Graphics", I. Stollinitz et. al. published 1996 by Morgan Kaufmann Publishers, Inc.

It would be desirable to provide a method and hardware embodiment of an encoder and method so as to provide for efficient and effective encoding and decoding of a series of coefficients in order to substantially increase the speed of encoding and decoding.

SUMMARY OF THE INVENTION

It is an object of the present invention to ameliorate one or more disadvantages of the prior art.

According to one aspect of the present invention there is provided a method of decoding a coded representation of a block of coefficients, the method comprises the step of: (i) performing, for each bitplane of said block from a maximum bitplane to a minimum bitplane, the sub-steps of: (i)(a) dividing a current bitplane of said block into a number of first sub-regions and/or a number of second sub-regions; (i)(b) decoding a portion of the coded representation as the respective significances of said first sub-regions in said current bitplane of said block; and (i)(c) decoding another portion of the coded representation as the respective bits of each coefficient in said second sub-regions of said current bitplane.

According to another aspect of the present invention there is provided apparatus for decoding a coded representation of a block of coefficients, the apparatus comprising: means for performing, for each bitplane of said block from a maximum bitplane to a minimum bitplane, the operations of the following dividing means, first decoding means, and second decoding means: dividing means for dividing a current bitplane of said block into a number of first sub-regions and/or a number of second sub-regions; first decoding means for decoding a portion of the coded representation as the respective significances of said first sub-regions in said current bitplane of said block; and second decoding means for decoding another portion of the coded representation as the respective bits of each coefficient in said second sub-regions of said current bitplane.

According to still another aspect of the present invention there is provided a computer program product comprising a computer readable medium having a computer program for decoding a coded representation of a block of coefficients, the computer program product comprising: means for performing, for each bitplane of said block from a maximum bitplane to a minimum bitplane, the operations of the following dividing means, first decoding means, and second decoding means: dividing means for dividing a current bitplane of said block into a number of first sub-regions and/or a number of second sub-regions; first decoding means for decoding a portion of the coded representation as the respective significances of said first sub-regions in said current bitplane of said block; and second decoding means for decoding another portion of the coded representation as the respective bits of each coefficient in said second sub-regions of said current bitplane.

According to still another aspect of the present invention there is provided a decoder for decoding a coded representation of a digital image, wherein the coded representation comprises coded n bitplanes of a block of coefficients, said decoder comprising: a decoder for decoding the coded n bitplanes to obtain, for each coefficient in the block, a corresponding bit plane number of the maximum significant bit plane of the coefficient and the bits below the most significant bit of said coefficient; a first storage means for storing, for each coefficient in the block, said bit plane number; a second storage means comprising n segments for storing, for each coefficient in the block, said bits of said coefficient in respective segments; and a pixel generator for generating pixels based on said corresponding bit plane numbers stored in the first storage means and the bits of the corresponding coefficients stored in the second storage means.

According to still another aspect of the present invention there is provided a decoder for decoding a coded representation of a block of coefficients, wherein said decoder processes each bitplane of said block from a maximum bitplane to a minimum bitplane in turn, and comprises: a first decoder for decoding a portion of the coded representation and setting a maximum bitplane number of a said coefficient to the number of a current bitplane, if said coefficient is significant in the current bitplane; wherein said decoder comprises: means for partitioning regions of a current bitplane; and means for decoding a portion of the coded representation and determining the respective significances of said.regions and coefficients in said current bitplane; a second decoder for decoding another portion of the coded representation as respective bits of said coefficients in the current bitplane, if said coefficients have a most significant bit in a bitplane greater than the current bitplane; a first storage means for storing, for each coefficient in the block, said maximum bit plane number; a second storage means comprising a plurality of segments for storing said respective bits of said coefficients in said current bitplane in one said segment, wherein for each coefficient in the block, said bits of any one said coefficient are in different segments; and a pixel generator for generating pixels based on said maximum bit plane numbers stored in the first storage means and the bits of the corresponding coefficients stored in the second storage means.

BRIEF DESCRIPTION OF THE DRAWINGS

Embodiments of the invention are described with reference to the drawings, in which.

DETAILED DESCRIPTION

Figure 1A:
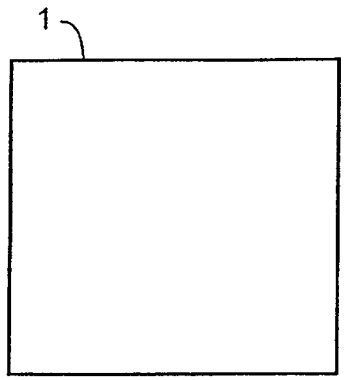
FIG. 1A illustrates an original image.

Where reference is made in any one or more of the accompanying drawings to steps and/or features, which have the same reference numerals, those steps and/or features have for the purposes of this description the same function (s) or operation(s), unless the contrary intention appears.

PREFERRED EMBODIMENT(S) OF METHOD

The principals of the preferred method have general applicability to the encoding and decoding of a block of coefficients. For ease of explanation, the preferred method is described with reference to the encoding and decoding of a block of transform coefficients of an image and it is not intended to be limited thereto. The method has also been described with reference to a number of specific examples of images and it is also not intended that the invention be limited to such specific examples.

The preferred method proceeds initially by means of a wavelet transform of image data. An overview of the wavelet process will now be described with reference to the accompanying drawings.

Figure 1B:
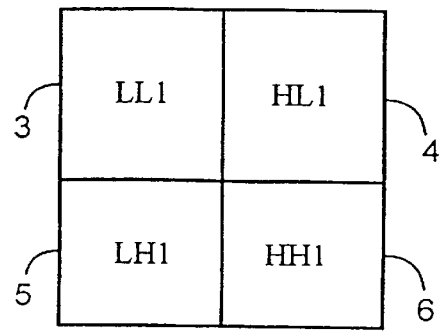
FIG. 1B illustrates a DWT transformation of the original image of FIG. 1.

Referring initially to FIGS. 1A and 1B, an original image 1 is transformed utilizing a Discrete Wavelet Transform (DWT) into four sub-images 3–6. The sub-images or sub-bands are normally denoted LL1, HL1, LH1 and HH1. The one suffix on the subband names indicates level 1. The LL1 subband is a low pass decimated version of the original image.

Figure 2:
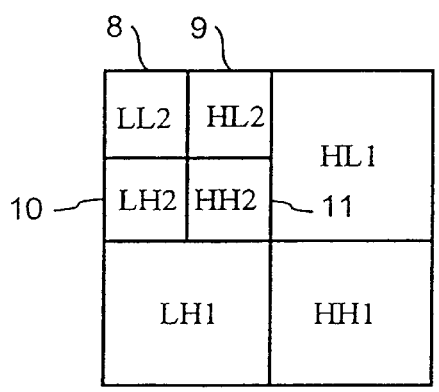
FIG. 2 illustrates a second level DWT transformation of the original image of FIG. 1.
Figure 3:
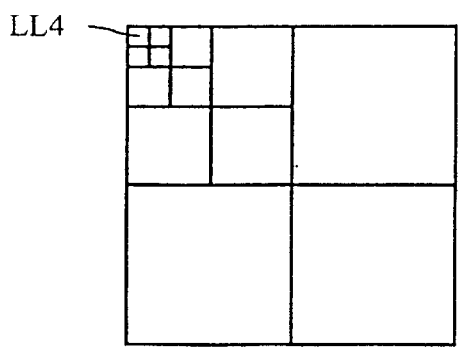
FIG. 3 illustrates a four level DWT transformation of the original of FIG. 1.

The wavelet transform utilized can vary and can include, for example, Haar basis functions, Daubechies basis functions etc. The LL1 subband is then in turn utilized and a second Discrete Wavelet Transform is applied as shown in FIG. 2 giving subbands LL2 (8), HL2 (9), LH2 (10), HH2 (11). This process is continued for example as illustrated in FIG. 3 wherein the LL4 subband is illustrated. Obviously, further levels of decomposition can be provided depending on the size of the input image. The lowest frequency subband is referred to as the DC subband. In the case of FIG. 3, the DC subband is the LL4 subband.

Each single level DWT can, in turn, be inverted to obtain the original image. Thus, a J-level DWT can be inverted as a series of J-single level inverse DWT's.

To code an image hierarchically the DC subband is coded first. Then, the remaining subbands are coded in order of decreasing level. That is for a 4 level DWT, the subbands at level 4 are coded after the DC subband (LL4). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

With standard images, the encoded subbands normally contain the "detail" information in the image. After quantization of the subbands, they often consist of a sparse array of values and substantial compression can be achieved by efficient encoding of their sparse matrix form.

Figure 4:
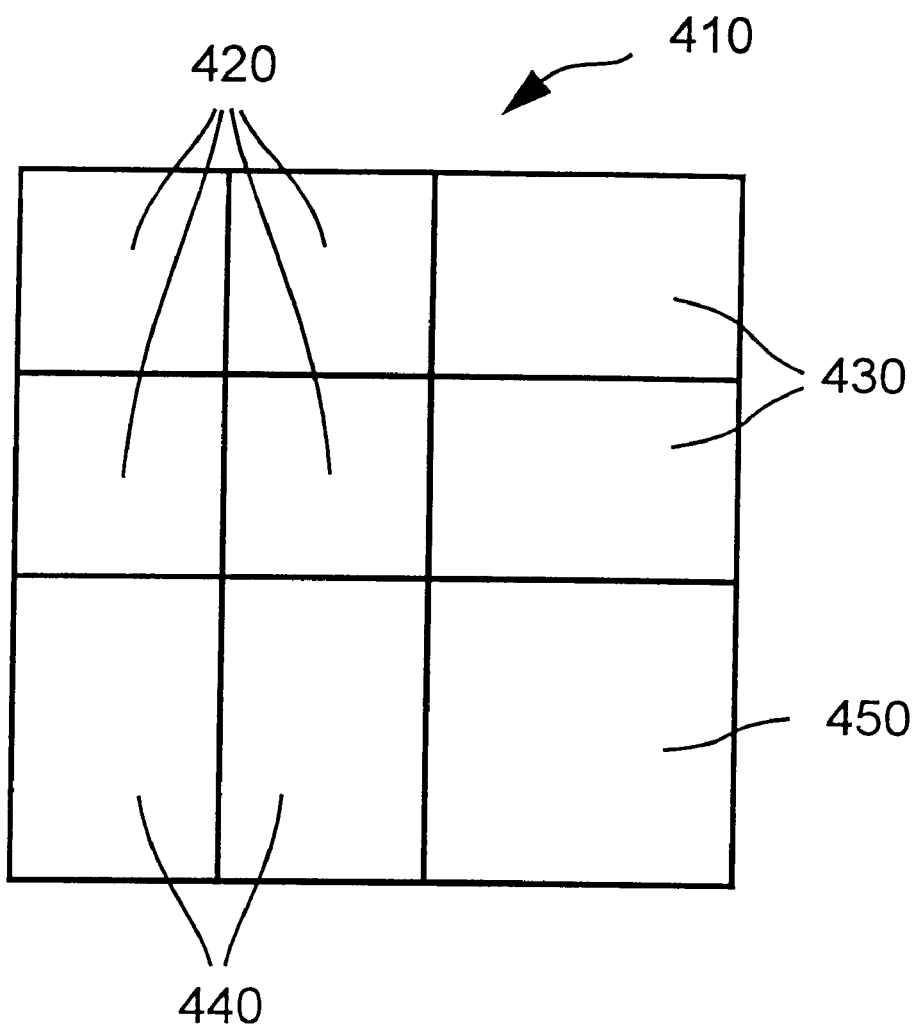
FIG. 4 illustrates the tiling of the subbands into 32×32 blocks.

Turning now to FIG. 4, there is shown the tiling of the subbands, such as HH1. The subbands are preferably tiles 410, 420, 430, 440 and 450 with 32×32 blocks of coefficients beginning from the top left-hand corner. The nomenclature 32×32 refers to 32 rows by 32 columns respectively.

Before proceeding with a description of the embodiments, a brief review of terminology used hereinafter is provided. For a binary integer representation of a number, "bit n" or "bit number n" refers to the binary digit n places to the left of the least significant bit (beginning with bit 0). For example, assuming an 8-bit binary representation, the decimal number 9 is represented as 00001001. In this number, bit 3 is equal to 1, while bits 2, 1, and 0 are equal to 0, 0, and 1, respectively. In addition, a transform of an image may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three-dimensional space that passes through each bit sequence at the same bitnumber is referred to as a "bitplane" or "bit plane". The term "bit plane number n" refers to that bit plane that passes through bit number n.

To simplify the description and not to obscure unnecessarily the invention, the transform coefficients are assumed hereinafter to be represented in a fixed point unsigned binary integer format, with an additional single sign bit. Preferably, 16 bits is used. That is, the decimal numbers −9 and 9 are represented with the same bit sequence, namely 1001, with the former having a sign bit equal to 1 to indicate a negative value, and the latter having a sign bit equal to 0 to indicate a positive value. In using an integer representation, the coefficients are implicitly already quantized to the nearest integer value, although this is not necessary for embodiments of the invention. Further, for the purpose of compression, any information contained in fractional bits is normally ignored.

A region of an image frame includes a set of contiguous image coefficients. The term coefficient is used hereinafter interchangeably with pixel, however, as will be well understood by a person skilled in the art, the former is typically used to refer to pixels in a transform domain (eg., a DWT domain). These sets or regions T are defined as having transform image coefficients $\{c_{i,j}\}$, where (i,j) is a coefficient coordinate.

A set or the region T of pixels at a current bit plane is said to be insignificant if the msb number of each coefficient in the region is less than the value of the current bit plane. To make the concept of region significance precise, a.mathematical definition is given in Equation (1). A set or region T of pixels is said to be insignificant with respect to (or at) bit plane n if, $$|c_{i,j}| < 2^n, \text{ for all } c_{i,j} \in T \tag{1}$$

By a partition of a set T of coordinates we mean a collection $\{T_m\}$ of subsets of T such that $$T = \bigcup_n T_n, \quad T_n \cap T_m = 0 \; \forall \; n \neq m$$

In other words if $c_{i,j} \in T$ then $c_{i,j} \in T_m$ for one, and only one, of the subsets $T_m$. In our case T is a square region and the set $\{T_m\}$ is the set consisting of the four quadrants of T.

The preferred method encodes a set of coefficients in an embedded manner using quadtrees. The use of the term embedded is taken to mean that every bit in a higher bit plane is coded before any bit in a lower bit plane. For example, every bit is coded in bit plane 7 before any bit in bit plane 6. In turn, all bits in bit plane 6 are coded before any bit plane 5 and so on.

A preferred embodiment of the preferred method is implemented utilizing the following pseudo-code. The preferred method preferably encodes a square block of coefficients, with a block size that is a power of 2 (typically 32×32 coefficients). Further, the preferred method utilizes a quadtree partition: that is each set or region is partitioned into its 4 quadrants: thus maintaining at all times square regions with a dimension equal to a power of two. The preferred method, during commencement, initializes three lists: a list of insignificant regions (LIR); a list of insignificant coefficients (LIC); and a list of significant coefficients (LSC). When single coefficients are removed from the list of insignificant sets (LIR), they are added to either the list of insignificant coefficients (LIC) or to the list of significant coefficients (LSC), depending on the significance of the coefficient.

The preferred method is initialized as follows. The LIC and LSC are initialized to be empty. The LIR is set to contain the four quadrants of the input block. The method commences by finding and coding $n_{max}$, which is the largest bit plane that contains a 1 bit in any one of the coefficients in the bitplane. Or in other words, the most significant bit of each coefficient is in bitplane $n_{max}$, or less. The encoded $n_{max}$ can be included in a header or sub-header of the bitstream for transmission. The preferred method then proceeds as follows:

1. Set $n = n_{max}$
2. For each coefficient in the list of insignificant coefficients (LIC)
   Code bit n of the coefficient (i.e. its significance)
   If the bit is 1 (i.e. it is significant) code a sign bit. Add the coefficient to the end of the LSC and remove the coefficient from the LIC.
3. For each region T in the list of insignificant regions (LIR)
   Code the significance of T.
   If T is significant and consists of more than one coefficient then partition T into its four quadrants and add these to the end of the LIR. Remove T from the list.
   If T is a single coefficient
      Remove T from the LIR
      If T is significant code a sign bit and add T to the end of the LSC
      Else add T to the end of the list of LIC
4. For each coefficient $c_{i,j}$ in the list of significant coefficients LSC (excluding those added to the list in step 3)
   Code bit n of $c_{i,j}$.
5. decrement n and go to step 2.

From the above, it can seen that output bitstream generally takes the following form

. . . LIC'LIR'LSC'. . .

where LIR' is the coded representation undertaken in step 3; LIC' is the coded representation undertaken in step 2; and LSC' is the coded representation undertaken in step 4. However, it should be noted that during the first iteration of the encoding process both LIC and LSC are empty and thus the output bitstream for the first iteration takes the form LIR'.

In addition to the preferred method, a simple Huffman code (or better a Golomb code) may be used to code groups of bits (for example groups of 4 bits) when coding the LIC and LSC. Further, when coding the significance of each quadrant of a region a 15-level Huffman code may be used to indicate the significance pattern of each of the 4 quadrants (one quadrant must be significant, hence the significance pattern can be one of 15 (and not 16) different patterns. Other forms of entropy encoding can be used, such as binary arithmetric coding to exploit any remaining redundancy.

As an alternative embodiment, the preferred method at step 3 if T consists of a 2×2 block of coefficients, may perform the following substep. Immediately code and output the significance of each coefficient of the 2×2 block, output the corresponding sign bit(s) if they are significant; and then add the coefficients to the end of the LSC or the LIC as appropriate. In the latter substep, the significant coefficients are added to the LSC list whereas the insignificant coefficients are added to the LIC list.

Preferably, the preferred method encodes a 32×32 block of data coefficients. For illustrative purposes only, the following example of a 4×4 block of coefficients is encoded in accordance with the preferred method.

$$\begin{bmatrix} 31 & 16 & 0 & 0 \\ 15 & 17 & 0 & 0 \\ 9 & 7 & 1 & 0 \\ 5 & 3 & 1 & 0 \end{bmatrix}$$

The above block consists of four quadrants A,B,C and D. The symbol A designates the top-left (2×2) quadrant of the block, B the top right, C the bottom left, and D the bottom right quadrant respectively. Furthermore, the symbols A1 denote the top left pixel of A, A2 the top right, A3 the bottom left, A4 the bottom right pixels respectively. Similarly B1 denotes the top left pixel of B and so on for the rest of the pixels.

According to the preferred method, $n_{max}$ is first determined, which in this case is 4. That is, the most significant bit of each coefficient is in bit plane 4 or less. Note, the numbering of the bit planes commences from 0. The variable $n_{max}$ is coded with 4 bits (since the coefficients have been constrained, so that $n_{max}$ is between 0 and 15.). Initially LIC=φ, LIR={A, B, C, D} and LSC=φ where symbol φ is used to denote the empty list.

Then, according to the preferred method, the bit planes are iteratively coded. Tile process commences at bit plane $n = n_{max} = 4$, and decrements n by one at each iteration.

1. At $n = n_{max} = 4$
   First, each coefficient in the list LIC is coded. Since there are none, no coding is undertaken.

Then, the significance of each region in the list LIR is coded.

For region A, a 1 bit is outputted, since it is significant at bit plane n=4. Then, the four quadrants of A are added, namely A1, A2, A3 and A4, to the end of the list LIR, and A is removed. Hence now LIR={B, C, D, A1, A2, A3, A4}.

For region B, a 0 bit is output, since it is insignificant at bit plane n=4.

For region C, a 0 bit is output.

For region D, a 0 bit is output.

For region A1, a 1 bit is output. Since A1 consists of the single coefficient 31. A1 is removed from the LIR. Since 31 (or A1) is significant, it is added (or its location in the block) to the LSC. The sign bit (0) of A1 is also outputted.

For region A2, a 1 bit is output. Since A2 consists of the single significant coefficient 16, it is removed from the LIR, and added to the end of the LSC. The sign bit (0) of A2 is also outputted. Now we have LSC={31, 16}.

For region A3, a 0 bit is output. Since it is a single insignificant coefficient we remove it from the LIR, add the coefficient 15 to the LIC. Now LIC={15 }.

For region A4 a 1 bit is output. Since A4 consists of the single significant coefficient 17, it is removed from the LIR, and added to the end of the LSC. The sign bit (0) of A4 is also outputted. Now LSC={31, 16, 17}.

Each coefficient in the LSC that was not added in the last step is now coded. Since there are none, no coding is undertaken.

Thus at the first iteration, the preferred method outputs the following bitstream 1000 10 10 0 10

At this stage, all the bits in bit plane 4 (and higher) have been coded. That is a decoder can reconstruct bit plane 4 (and higher) by reading in the bits from the coded bit stream. The decoding method is the same except that the significance decisions are determined by reading from the bit stream (this is why the significance decision is written to the bit stream). The other coefficient bits are simply read in as is. Note that the decoder execution path is identical, to the encoder, so that the decoder knows the meaning of each new bit that it reads.

2. At n=3

Initially LIC={15}, LIR={B, C, D} and LSC={31, 16, 17}.

Firstly, bit n=3 of each coefficient in the LIC is coded. That is, a 1 bit is output for the coefficient 15 and a sign bit (0). Since it is significant (a 1 bit has been outputted), a sign bit is outputted, the coefficient 15 is removed from LIC and added to the end of the LSC. So now LSC={31, 16, 17, 15}.

The significance of each of the regions in LIR are now coded

For region B, a 0 bit is output.

For region C, a 1 bit is output, since it is significant at bitplane n=3. The region C is partitioned into four quadrants C1,C2,C3 and C4 which are added to the end of LIR. C is then removed from LIR. Hence now LIR={B,D, C1,C2,C3, C4}.

For region D, a 0 bit is output.

For region C1, a 1 bit is output. Since C1 consists of the single significant coefficient 9, it is removed from the LIR, and added to the end of the LSC. The sign bit (0) of C1 is also outputted. Now we have LSC={31, 16,17,15,9}.

For region C2, a 0 bit is output. Since it is a single insignificant coefficient we remove it from the LIR, add the coefficient 7 to the LIC. Now LIC={7}.

For region C3, a 0 bit is output. Since it is a single insignificant coefficient we remove it from the LIR, add the coefficient 5 to the LIC. Now LIC={7,5}.

For region C4, a 0 bit is output. Since it is a single insignificant coefficient we remove it from the LIR, add the coefficient 3 to the LIC. Now LIC={7,5,3}

Now we code bit n=3 of each coefficient on the LSC (that was not just added above)

We output 1, 0, and 0 as bit n=3 of 31, 16 and 17 respectively

Thus at the second iteration, the preferred method outputs the following bitstream 10 0 1 0 10 0 0 0 1 0 0

3. At n=2

Initially we have LIC={7, 5, 3}, LIR={C, D} and LSC={31, 16, 17, 15, 9}.

Firstly, bit n=2 (or equivalently the significance at bit plane n=2) of each coefficient in the LIC is coded. That is, we output a 1, 1, and 0 for 7, 5, and 3 respectively. In addition, a sign bit for 7 (0) and 5 (0) is outputted and these coefficients are moved to the LSC. We leave 3 in the LIC.

Then the significance of each region in the LIR is coded

For region B, a 0 bit is output and for region D a 0 bit is output.

Finally we update bit n=2 for each of the coefficients in the LSC (not added above).

We output a 1, 0, 0, 1, and 0 for 31 , 16. 17, 15 and 9 respectively.

Thus at the third iteration, the preferred method outputs the following bitstream 10 10 0 0 0 1 0 0 1 0

We continue in this fashion until bit plane 0, or some other terminating point. Note that we can terminate after any one of the (three) sub-passes, if we use a special termination code. (Basically FF is reserved as a termination code, and we force the coded bit stream never to contain an FF, unless we deliberately insert a termination code.

As mentioned previously, the method is preferably utilized in encoding 32×32 blocks of coefficients. In these circumstances, the original quadrants A,B,C,D each consist of 16×16 coefficients and the regions A1,A2, . . . D4 each consist of 8×8 coefficients. It will be thus evident in encoding a 32×32 block, the block is partitioned in accordance with quadtree method five times, whereas in the example given the 4×4 block is partitioned only twice.

The decoding process simply mimics the encoding process to reconstruct the pixels from the coded representation. The decoding process builds the LIC, LIR, and LSC lists for each bitplane from the bitstream and from a knowledge of the partitioning process. From these lists the decoding process then generates the bit values for the bitplane.

For illustrative purposes only, the following example explains the decoding of the bitstream of the previous example. Firstly, the decoding method receives and decodes $n_{max}$. The method sets all bit values in the bitplanes greater than $n_{max}$ to zero. The method then decodes the bit values for the bitplane $n_{max}$. Initially, the decoding method decodes the following portion of the bitstream 1000 10 10 0 10

Initially, the LIC, LIR and LSC lists are set as follows: LIC=φ, LIR={A, B, C, D} and LSC=φ. The process then decodes the bitstream with reference to the LIC list. Since the LIC is empty no decoding is undertaken. Next, the process decodes the bitstream with reference to the LIR list. Thus region A will allocated a 1 bit (the first bit in the bitstream 1000 10 10 0 10). The decoding method has an inherent knowledge of the partitioning process, and in response to this 1 bit updates the LIR list as follows {B, C, D, A1, A2, A3, A4}. The decoding process continues with the bits in the bitstream allocating region B the 0 bit, region C the next 0 bit, region D the next 0 bit, coefficient A1 the bits 10, coefficient A2 the next bits 10, coefficient A3 the bit 0, and coefficient A4 the bits 10. From these values the bitplane at $n_{max}$ can be generated. During this stage, LIC and LSC lists are also updated resulting in LSC={A1,A2,A4} and LIR={A3}. These updated lists will be used in the decoding of the subsequent bits of the bitstream in generating the bit values of the next bitplane $n_{max-1}$. As can be seen, the decoding process mimics the encoding process in order to reconstruct the pixels.

First Preferred Embodiment of Apparatus

Figure 5:
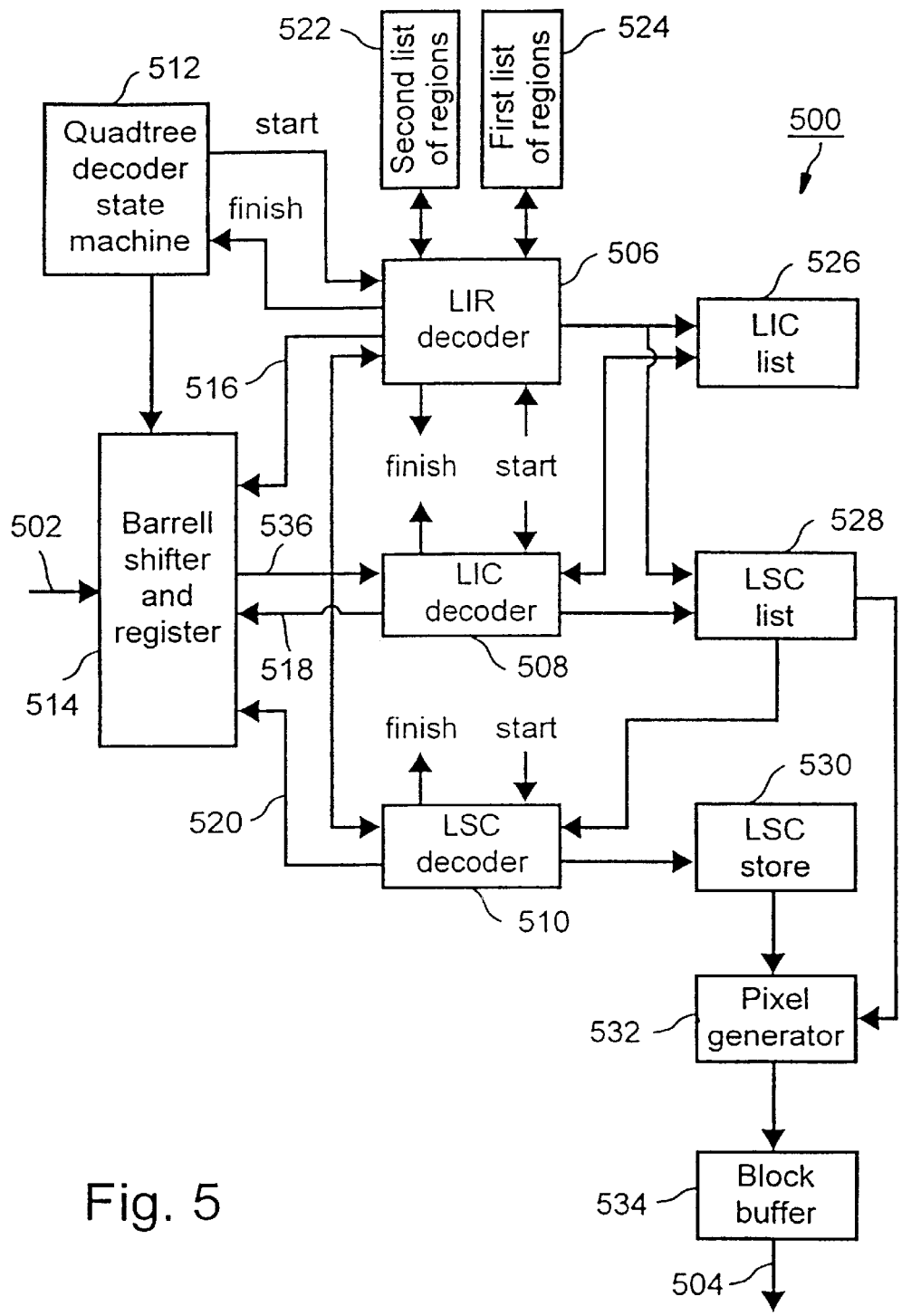
FIG. 5 illustrates an decoder in accordance with a preferred embodiment of the invention.

Turning now to FIG. 5, there is shown a decoder in accordance with a first preferred embodiment for implementing the preferred method. The coefficient decoder 500 is designed to provide a continual flow of output decoded data 504 taking in corresponding encoded data 502.

The decoder 500 includes the following main logic portions; a LIR decoder 506, a LIC decoder 508, and a LSC decoder 510, all of which are controlled by a finite state machine 512. The decoder 500 also includes a barrel shifter and register 514, having a code input 502 and output 516. The barrel shifter and register 514 also has control inputs from the finite state machine 512, the LIR decoder 506, LIC decoder 508, and LSC decoder 510. The control signal from the finite state machine 512 to the barrel shifter and resister 514 controls which control signal 516, 518, 520 from the LIR, LIC, and LSC decoders is to be read. The barrel shifter and register 514 outputs LIR, LIC and LSC encoded data to the LIR, LIC, and LSC decoders 506, 508, 510 in response to the control signals 516, 518, and 520 respectively. The finite state machine 512 also sends start and finish signals to each of the LIR, LIC, and LIR decoders 506, 508, 510. Specifically, the finite state machine 512 starts and finishes the decoders 506, 508, 510 in the following sequence LIR LIC LIR LSC LIC LIR LSC, and so on. This sequence follows the format of the encoded bits allowing each of decoders 506, 508 and 510 to decode the corresponding portions of the encoded input bitstream.

The decoder 500 also includes a memory 524 for storing a first list of regions and a FIFO 522 for storing a second list of regions. The decoder also includes a memory 526 for storing the LIC list, a memory 528 for storing the LSC list and a memory 530 for storing a LSC store, which will be described in more detail below. The decoder 500 further includes a pixel generator 532 coupled to the LSC store 530 and LSC list 528; and a block buffer 534

The operation of the LIR decoder 506 will now be described. Initially the LIR stores the regions A,B,C and D in the first list of regions 524, then proceeds as follows:

1. The LIR decoder 506 reads each region on the first list of regions 524 in turn and performs the following;
    (i) If the encoded bit 536 corresponding to the read region is significant, the LIR decoder 506 stores the quadrants of the region on the second list of regions 522 and removes the region from the first list 524; and
    (ii) if the encoded bit 536 corresponding to the read region is insignificant, the LIR decoder 506 retains the region on the first list 524.

2. The LIR decoder 506 then reads each region on the second list 522 and performs the following
    (i) If the LIR encoded bit 536 corresponding to the read region is significant and the region is able to be further partitioned, the LIR decoder 506 stores the quadrants of the region on the second list 522 and removes the read region from the second list 522;
    (ii) If the LIR encoded bit 536 corresponding to the read region is significant and the region is not able to be further partitioned (viz the region is a 1×1 pixel), the LIR decoder 506 stores the following on the LSC list 528; the index to the pixel (the location of the coefficient in the block), the pixel's maximum bit number and sign bit. The LIR decoder 506 then removes the read region from the second list 522;
    (iii) If the LIR encoded bit 536 corresponding to the read region is insignificant and the region is able to be further partitioned, the LIR decoder removes the read region from the second list 522 and stores it on the first list 524; and
    (iv) If the LIR encoded bit 536 corresponding to the read region is insignificant and the region is not able to be further partitioned (viz the region is a 1×1 pixel), the LIR decoder 506 stores the index to the pixel (location of the coefficient in the block) on the LIC list and removes it from the second list 522.

The LIR decoder 506 continues this process until there is no more regions left on the second list 522.

The operation of the LIC decoder 508 will now be described. The LIC decoder 508 reads each index from the LIC list 526 in turn. The LIC decoder 508 then reads the corresponding LIC encoded bit 536 and if the encoded bit 536 is a binary zero the index is retained on the LIC list. If however, the encoded bit is a binary one, the index is moved to the LSC list 528 together with it's maximum bit number and sign bit (the following bit in the incoming stream). The index is then removed from the LIC list 526. The LIC decoder 508 continues until all indexes on the LIC list 526 have been processed.

Figure 6:
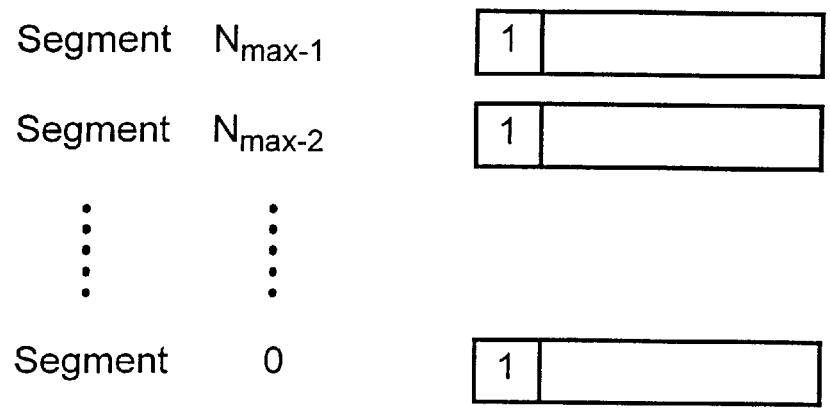
FIG. 6 illustrates the structure of the LSC store used in the decoder of FIG. 5.

The LSC decoder 510 reads each of it's corresponding LSC encoded bits 536 and copies these into the LSC store 530. Turning now to FIG. 6, there is shown the structure of the LSC store 530. The LSC store 530 consists of $N_{max}$ segments, where $N_{max}$ is the maximum significant bitplane for all the block. The first encoded LSC portion of the bitstream is copied to segment $N_{max-1}$, the second encoded LSC portion of the bitstream is copied to segment $N_{max-2}$ and so on.

The pixel generator 532, initially reads the first entry in the LSC list 528 to obtain the following information; the index to the pixel (the location of the pixel in the block), the associated maximum bit number and sign bit. The pixel generator 532 also reads the first bit from all of the segments $N_{max-1}$ through to 0 in the LSC store 530. The pixel generator 532 then generates a pixel having a width of 16 bits. The pixel generator 532 then reads the second entry in the LSC list 528 and also the second bit from all the segments $N_{max-1}$ through to 0 in the LSC store 530.

Figure 7:
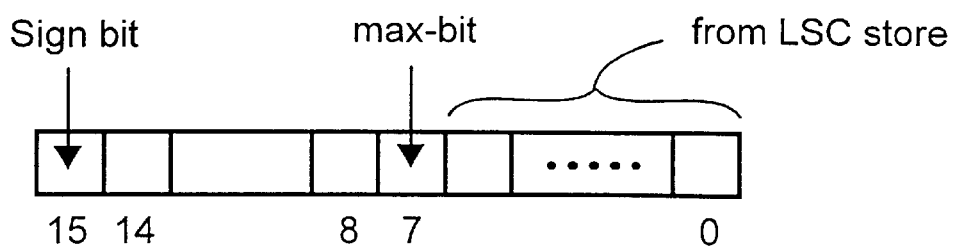
FIG. 7 illustrates an example of a pixel generated by the pixel generator in the decoder of FIG. 5.

Turning now to FIG. 7, there is shown an example of a pixel generated by pixel generator 532. The maximum bit number is in this case 7 and it's corresponding bit is set to binary one. The remaining insignificant bits 0 to 6 are obtained from segments 0 to 6 of the LSC store 530.

The pixel generator 532 then stores the generated pixel in the block buffer 534 at it's corresponding location in the block. This location is obtained from the information stored in the LSC list 528. Once all the pixels have been reconstructed, the block buffer 534 outputs the decoded block of pixels.

Second Preferred Embodiment of Apparatus

Figure 8:
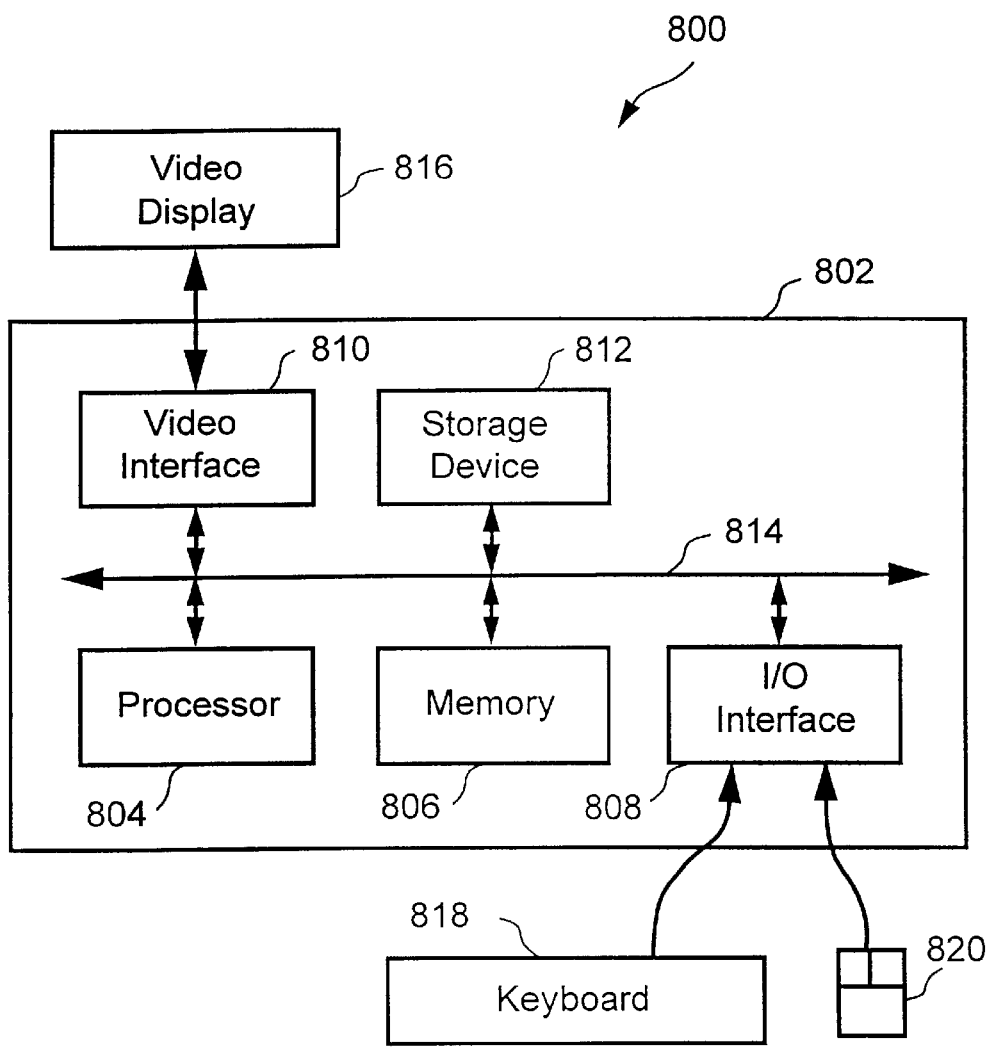
FIG. 8 illustrates a general purpose computer for implementating the preferred method.

The encoding and decoding processes of the preferred method are preferably practiced using a conventional general-purpose computer, such as the one shown in FIG. 8, wherein the processes may be implemented as software executing on the computer. In particular, the steps of the coding and/or decoding methods are effected by instructions in the software that are carried out by the computer. The software may be divided into two separate parts; one part for carrying out the encoding and/or decoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding digital images and decoding coded representations of digital images in accordance with the embodiments of the invention.

The computer system 800 consists of the computer 802, a video display 816, and input devices 819, 820. In addition, the computer system 800 can have any of a number of other output devices including line printers, laser printers, plotters, and other reproduction devices connected to the computer 802. The computer system 800 can be connected to one or more other computers via a communication interface using an appropriate communication channel such as a modem communications path, a computer network, or the like. The computer network may include a local area network (LAN), a wide area network (WAN), an Intranet, and/or the Internet.

The computer 802 itself consists of a central processing unit(s) (simply referred to as a processor hereinafter) 804, a memory 806 which may include random access memory (RAM) and read-only memory (ROM), input/output (IO) interfaces 808, a video interface 810, and one or more storage devices generally represented by a block 812 in FIG. 8. The storage device(s) 812 can consist of one or more of the following: a floppy disc, a hard disc drive, a magneto-optical disc drive, CD-ROM, magnetic tape or any other of a number of non-volatile storage devices well known to those skilled in the art. Each of the components 804 to 812 is typically connected to one or more of the other devices via a bus 814 that in turn can consist of data, address, and control buses.

The video interface 810 is connected to the video display 816 and provides video signals from the computer 802 for display on the video display 816. User input to operate the computer 802 can be provided by one or more input devices. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Exemplary computers on which the embodiment can be practiced include IBM-PC/ATs or compatibles, one of the Macintosh (™) family of PCs, Sun Sparcstation (™), or the like. The foregoing are merely exemplary of the types of computers with which the embodiments of the invention may be practiced. Typically, the processes of the embodiments, described hereinafter, are resident as software or a program recorded on a hard disk drive (generally depicted as block 812 in FIG. 8) as the computer readable medium, and read and controlled using the processor 804. Intermediate storage of the program and pixel data and any data fetched from the network may be accomplished using the semiconductor memory 806, possibly in concert with the hard disk drive 812.

In some instances, the program may be supplied to the user encoded on a CD-ROM or a floppy disk (both generally depicted by block 812), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

We claim:

1. An apparatus for decoding a coded representation of at least a block of coefficients from a single subband of coefficients, said apparatus comprising:

means for providing a list of regions representative of corresponding regions of said block;

a first storage means adapted to store, for each coefficient in the block, an associated maximum bit-plane number;

a second storage means comprising n segments for storing, for each coefficient in the block, bits of said coefficient in respective segments;

a processor for processing each bit-plane of said block from the maximum bit-plane to a minimum bit-plane, the processor comprising:

a first decoder for decoding a portion of the coded representation and determining in accordance therewith a significance of those coefficients in bit-plane n that are found to be insignificant and belonging to a region of a predetermined minimum size in a previous bit-plane n+1, and if a coefficient is determined to be significant, storing in said first storage means the bit-plane number n as the associated maximum bit-plane number of said coefficient;

a second decoder for decoding another portion of the coded representation and determining in accordance therewith a significance of each region that comprises more than one coefficient in bit-plane n, and for each such region that is determined significant and comprises more than one coefficient, partitioning the region into a plurality of new regions, and for each region that is determined significant and comprises a single coefficient, storing in said first storage means the bit-plane number n as the associated maximum bit-plane number of said single coefficient; and a third decoder for decoding another portion of the coded representation and storing in said second storage means the bit n of each coefficient that was found to be significant in the previous bit-planes; and a pixel generator for generating pixels based on said corresponding maximum bit-plane numbers stored in the first storage means and the bits of the corresponding coefficients stored in the segments of the second storage means.

2. An apparatus for decoding a bitstream representative of at least a block of coefficients from a single subband of coefficients, wherein said apparatus comprises:

a generating unit for generating at least a list of insignificant coefficients, a list of significant coefficients, and a list of insignificant regions, wherein the list of insignificant coefficients and the list of significant coefficients are initially empty, and the list of insignificant regions comprises a list of regions of the block;

a processor for processing each bit-plane n of the block from a maximum bit-plane to a minimum bit-plane, the processor comprising:

a first decoder for decoding a number of bits in the bitstream and determining in accordance therewith a significance of each coefficient in bit-plane n corresponding to each coefficient listed in the list of insignificant coefficients, and if a coefficient is significant, removing the coefficient from the list of insignificant coefficients and adding the coefficient together with a maximum bit-plane number for the coefficient to the list of significant coefficients;

a second decoder for decoding a number of bits in the bitstream and determining in accordance therewith a significance of each region in bit-plane n corresponding to each region listed in the list of insignificant regions, wherein said second decoder comprises:

means for partitioning a region listed in the list of insignificant regions into a plurality of sub-regions if said region is determined significant and comprises more than one coefficient, and removing said region from the list of insignificant regions and adding each sub-region as a new region to the list of insignificant regions;

means for removing a region listed in the list of insignificant regions if said region is determined significant and comprises a single coefficient, and adding the single coefficient to the list of significant coefficients together with the coefficient's maximum bit-plane number; and means for removing a region listed in the list of insignificant regions and adding the region to the list of insignificant coefficients if said region is determined insignificant and comprises a single coefficient; and a third decoder for decoding a number of bits in the bitstream and storing in a storage means the bit n of each coefficient listed in the list of significant coefficients except those coefficients that were added to the list of significant coefficients during the coding of bit-plane n;

a storage means comprising a plurality of segments for storing said respective bits of said coefficients in said current bitplane in one said segment, wherein for each coefficient in the block, said bits of any one coefficient are in different segments; and a pixel generator for generating pixels based on said maximum bit plane numbers stored in the list of significant coefficients and the bits of the corresponding coefficients stored in the segments of the storage means.

3. A method of decoding a bitstream representative of at least a block of coefficients from a single subband of coefficients, wherein said method comprises the steps of:

generating at least a list of insignificant coefficients, a list of significant coefficients, and a list of insignificant regions, wherein the list of insignificant coefficients and the list of significant coefficients are initially empty, and the list of insignificant regions comprises a list of regions of the block;

performing, for each bit-plane n of the block from a maximum bit-plane to a minimum bit-plane, the sub-steps of:

(i) decoding a number of bits in the bitstream and determining in accordance therewith a significance of each coefficient in bit-plane n corresponding to each coefficient listed in the list of insignificant coefficients, and if a coefficient is significant, removing the coefficient from the list of insignificant coefficients and adding the coefficient to the list of significant coefficients;

(ii) decoding a number of bits in the bitstream and determining in accordance therewith a significance of each region in bit-plane n corresponding to each region listed in the list of insignificant regions, and performing for each region listed in the list of insignificant regions the sub-steps of:

(a) partitioning said region into a plurality of sub-regions if said region is determined significant and comprises more than one coefficient, and removing said region from the list of insignificant regions and adding each said sub-region as a new region to the list of insignificant regions;

(b) if said region is determined significant and comprises a single coefficient, removing said single coefficient from the list of insignificant regions and adding the single coefficient to the list of significant coefficients; and (c) if said region is determined insignificant and comprises a single coefficient, removing said single coefficient from the list of insignificant regions and adding the single coefficient to the list of insignificant coefficients; and (iii) decoding a number of bits in the bitstream and setting in accordance therewith bit n of each coefficient listed in the list of significant coefficients except those coefficients that were added to the list of significant coefficients during the coding of bit-plane n.

4. A method of decoding a bitstream representative of at least a block of coefficients from a single subband of coefficients, wherein said method comprises the steps of:

generating at least a list of insignificant coefficients, a list of significant coefficients, and a list of insignificant regions, wherein the list of insignificant coefficients and the list of significant coefficients are initially empty, and the list of insignificant regions comprises a list of regions of the block;

performing, for each bit-plane n of the block from a maximum bit-plane to a minimum bit-plane, the sub-steps of:

(i) decoding a number of bits in the bitstream and determining in accordance therewith a significance of each coefficient in bit-plane n corresponding to each coefficient listed in the list of insignificant coefficients, and if a coefficient is significant, removing the coefficient from the list of insignificant coefficients and adding the coefficient to the list of significant coefficients;

(ii) decoding a number of bits in the bitstream and determining in accordance therewith a significance of each region in bit-plane n corresponding to each region listed in the list of insignificant regions that is greater than a predetermined minimum size, and performing for each such region, the sub-step of:
(a) partitioning said region into a plurality of sub-regions if said region is determined insignificant, and removing said region from the list of insignificant regions and adding each said sub-region as a new region to the list of insignificant regions;

(iii) decoding a number of bits in the bitstream and determining in accordance therewith a significance of each coefficient in each region in bit-plane n corresponding to each region listed in the list of insignificant regions that is of the predetermined minimum size, and performing for each such region, the sub-step of:
(a) removing each coefficient in the region from the list of insignificant regions and adding the coefficient to the list of significant coefficients if the coefficient is significant, or adding the coefficient to the list of insignificant coefficients if the coefficient is insignificant; and (iv) decoding a number of bits in the bitstream and setting in accordance therewith bit n of each coefficient listed in the list of significant coefficients except those coefficients that were added to the list of significant coefficients during the coding of bit-plane n.

5. An apparatus for decoding a bitstream representative of at least a block of coefficients from a single subband of coefficients, wherein said apparatus comprises:
a generating unit for generating at least a list of insignificant coefficients, a list of significant coefficients, and a list of insignificant regions, wherein the list of insignificant coefficients and the list of significant coefficients are initially empty, and the list of insignificant regions comprises a list of regions of the block; and
a processor for processing each bit-plane n of the block from a maximum bit-plane to a minimum bit-plane, the processor comprising:
a first decoder for decoding a number of bits in the bitstream and determining in accordance therewith a significance of each coefficient in bit-plane n corresponding to each coefficient listed in the list of insignificant coefficients, and if a coefficient is significant, removing the coefficient from the list of insignificant coefficients and adding the coefficient to the list of significant coefficients;
a second decoder for decoding a number of bits in the bitstream and determining in accordance therewith a significance of each region in bit-plane n corresponding to each region listed in the list of insignificant regions, wherein said second decoder comprises;
means for partitioning a region listed in the list of insignificant regions into a plurality of sub-regions if said region is determined significant and comprises more than one coefficient, and removing said region from the list of insignificant regions and adding each said sub-region as a new region to the list of insignificant regions;
means for removing a region listed in the list of insignificant regions and adding the region to the list of significant coefficients if said region is determined significant and comprises a single coefficient, and
means for removing a region listed in the list of insignificant regions and adding the region to the list of insignificant coefficients if said region is determined insignificant and comprises a single coefficient; and
a third decoder for decoding a number of bits in the bitstream and setting in accordance therewith bit n of each coefficient listed in the list of significant coefficients except those coefficients that were added to the list of significant coefficients during the coding of bit-plane n.

6. An apparatus for decoding a bitstream representative of at least a block of coefficients from a single subband of coefficients, wherein said apparatus comprises:
a generating unit for generating at least a list of insignificant coefficients, a list of significant coefficients, and a list of insignificant regions, wherein the list of insignificant coefficients and the list of significant coefficients are initially empty, and the list of insignificant regions comprises a list of regions of the block; and
a processor for processing each bit-plane n of the block from a maximum bit-plane to a minimum bit-plane, the processor comprising:
a first decoder for decoding a number of bits in the bitstream and determining in accordance therewith a significance of each coefficient in bit-plane n corresponding to each coefficient listed in the list of insignificant coefficients, and if a coefficient is significant, removing the coefficient from the list of insignificant coefficients and adding the coefficient to the list of significant coefficients;
a second decoder for decoding a number of bits in the bitstream and determining in accordance therewith a significance of each region in bit-plane n corresponding to each region listed in the list of insignificant regions that is greater than a predetermined minimum size, wherein said second decoder comprises:
means for partitioning a region listed in the list of insignificant regions into a plurality of sub-regions if said region is determined insignificant and is greater than said predetermined size, and removing said region from the list of insignificant regions and adding each said sub-region as a new region to the list of insignificant regions;
a third decoder for decoding a number of bits in the bitstream and setting in accordance therewith the significance of each coefficient in each region in bit-plane n corresponding to each region listed in the list of insignificant regions that is of the predetermined minimum size, wherein said third decoder comprises:
means for removing each coefficient in the region from the list of insignificant regions that is of the minimum predetermined size and adding the coefficient to the list of significant coefficients if the coefficient is significant, or adding the coefficient to the list of insignificant coefficients if the coefficient is insignificant; and
a fourth decoder for decoding a number of bits in the bitstream and setting in accordance therewith bit n of each coefficient listed in the list of significant coefficients except those coefficients that were added to the list of significant coefficients during the coding of bit-plane n.

7. A computer program product comprising a computer-readable medium having a computer program for decoding a bitstream representative of at least a block of coefficients from a single subband of coefficients, the computer program product comprising code that performs the steps of:

a generating step of generating at least a list of insignificant coefficients, a list of significant coefficients, and a list of insignificant regions, wherein the list of insignificant coefficients and the list of significant coefficients are initially empty, and the list of insignificant regions comprises a list of regions of the block; and a processing step of processing each bit-plane n of the block from a maximum bit-plane to a minimum bit-plane, the processing step comprising the steps of:

a first decoding step for decoding a number of bits in the bitstream and determining in accordance therewith a significance of each coefficient in bit-plane n corresponding to each coefficient listed in the list of insignificant coefficients, and if a coefficient is significant, removing the coefficient from the list of insignificant coefficients and adding the coefficient to the list of significant coefficients;

a second decoding step for decoding a number of bits in the bitstream and determining in accordance therewith a significance of each region in bit-plane n corresponding to each region listed in the list of insignificant regions, wherein said second decoding step comprises:

partitioning a region listed in the list of insignificant regions into a plurality of sub-regions if said region is determined significant and comprises more than one coefficient, and removing said region from the list of insignificant regions and adding each said sub-region as a new region to the list of insignificant regions;

setting, for a region listed in the list of insignificant regions, if said region is determined insignificant and comprises more than one coefficient, the bits of the region in bit-plane n to zero;

removing a region listed in the list of insignificant regions and adding the region to the list of significant coefficients if said region is determined significant and comprises a single coefficient; and removing a region listed in the list of insignificant regions and adding the region to the list of insignificant coefficients if said region is determined insignificant and comprises a single coefficient; and a third decoding step for decoding a number of bits in the bitstream and setting in accordance therewith bit n of each coefficient listed in the list of significant coefficients except those coefficients that were added to the list of significant coefficients during the coding of bit-plane n.

8. A computer program product comprising a computer-readable medium having a computer program for decoding a bitstream representative of at least a block of coefficients from a single subband of coefficients, the computer program product comprising code that performs the steps of:

a generating step of generating at least a list of insignificant coefficients, a list of significant coefficients, and a list of insignificant regions, wherein the list of insignificant coefficients and the list of significant coefficients are initially empty, and the list of insignificant regions comprises a list of regions of the block; and a processing step of processing each bit-plane n of the block from a maximum bit-plane to a minimum bit-plane, the processing step comprising the steps of:

a first decoding step for decoding a number of bits in the bitstream and determining in accordance therewith a significance of each coefficient in bit-plane n corresponding to each coefficient listed in the list of insignificant coefficients, and if a coefficient is significant, removing the coefficient from the list of insignificant coefficients and adding the coefficient to the list of significant coefficients;

a second decoding step for decoding a number of bits in the bitstream and determining in accordance therewith a significance of each region in bit-plane n corresponding to each region listed in the list of insignificant regions that is greater than a predetermined minimum size, wherein said second decoding step comprises:

partitioning a region listed in the list of insignificant regions into a plurality of sub-regions if said region is determined insignificant and is greater than said predetermined minimum size, and removing said region from the list of insignificant regions and adding each said sub-region as a new region to the list of insignificant regions;

a third decoding step for decoding a number of bits in the bitstream and setting in accordance therewith the significance of each coefficient in each region in bit-plane n corresponding to each region listed in the list of insignificant regions that is of the predetermined minimum size, wherein said third decoding step comprises:

removing each coefficient in the region from the list of insignificant regions that is of the predetermined minimum size and adding the coefficient to the list of significant coefficients if the coefficient is significant, or adding the coefficient to the list of insignificant coefficients if the coefficient is insignificant; and a fourth decoding step for decoding a number of bits in the bitstream and setting in accordance therewith bit n of each coefficient listed in the list of significant coefficients except those coefficients that were added to the list of significant coefficients during the coding of bit-plane n.

* * * * *

UNITED STATES PATENT AND TRADEMARK OFFICE
CERTIFICATE OF CORRECTION

PATENT NO. : 6,542,641 B1
DATED : April 1, 2003
INVENTOR(S) : Andrew et al.

It is certified that error appears in the above-identified patent and that said Letters Patent is hereby corrected as shown below:

Title page,
Item [57], ABSTRACT,
Line 1, "an" should read -- a --.
Insert Item -- [74] *Attorney, Agent, or Firm* - Fitzpatrick, Cella, Harper & Scinto --.

Column 1,
Line 36, "graphics." should read -- graphics, --.

Column 3,
Line 18, "an" should read -- a --.

Column 7,
Line 55, "coded" should read -- coded. --.

Column 8,
Line 9, "LIC={7,5,3}" should read -- LIC={7,5,3}. --;
Line 11, "above)" should read -- above). --;
Line 13, "respectively" should read -- respectively. --; and
Line 26, "coded" should read -- coded. --.

Signed and Sealed this

Seventeenth Day of August, 2004

JON W. DUDAS
*Acting Director of the United States Patent and Trademark Office*